Jan. 1, 1963  J. F. GORDON  3,071,717
MOTOR STARTING CIRCUIT
Filed April 28, 1961

TORQUE & CURRENT

INVENTOR.
JAMES F. GORDON
BY
HIS ATTORNEY

United States Patent Office 3,071,717
Patented Jan. 1, 1963

3,071,717
MOTOR STARTING CIRCUIT
James F. Gordon, Anchorage, Ky., assignor to General Electric Company, a corporation of New York
Filed Apr. 28, 1961, Ser. No. 106,349
6 Claims. (Cl. 318—221)

The present invention relates to a new and improved motor starting circuit employing a pair of solid state silicon controlled rectifiers as switching means for controlling the energization of the starting circuit.

Many electric motors energized by a single phase alternating current comprise a run winding for the operating energization of the motor and a start winding adapted to provide a phase displacement for providing the initial starting torque. After the motor has reached or approached the operating speed, means are provided for removing the start winding from the motor circuit. Various arrangements have been used and proposed for removing the start winding from the motor circuit as the motor comes up to operating speed. One such arrangement involves the use of a current operated relay switch energized by a special auxiliary winding wound around the start pole of the motor stator which interrupts the starting circuit by opening of the relay switch as a result of the induced current in the auxiliary winding as the motor comes up to operating speed. Another means commonly employed includes a centrifugal switch operated by the motor rotor and adapted to open the starting circuit at a predetermined speed of the rotor. Centrifugal switches are seldom used in sealed motors such as those used in the household refrigeration industry and which are housed within a casing due to their inaccessibility for servicing. In addition the centrifugal switches as well as the current operated relays are wholly or partially mechanical devices and as such are subject to failure of several types including welded or dirty contacts, improper adjustments, and similar mechanical failures.

It is an object of the present invention to provide an electric motor including a run winding and a start winding and means for de-energizing the start winding without the use of mechanical or electro-mechanical devices comprising electrical moving contacts for making and breaking the starting circuit.

Another object of the invention is to provide in combination with a motor, a motor starting circuit including a pair of silicon controlled rectifiers arranged to interrupt the starting circuit when the motor is up to speed.

A more specific object of the invention is to provide a motor starting circuit including means for adjusting the point at which the start winding is removed from the motor circuit as the motor comes up to speed.

Further objects and advantages of the invention will become apparent as the following description proceeds and the features of novelty which characterize the invention will be pointed out with particularity in the claims annexed to and forming a part of this specification.

In accordance with the present invention, there is provided in combination with a motor comprising a run winding and a start winding, an improved switching means for removing the start winding from the motor circuit when the motor comes up to or approaches its operating speed. This improved switch means comprises a pair of parallel connected and oppositely disposed silicon controlled rectifiers forming part of the motor starting circuit including the start winding. Each of the silicon controlled rectifiers comprise a cathode, anode and gating electrode and are of the type wherein conduction through the rectifier is initiated by the gating electrode or more specifically by the application of a gating signal to the gate electrode or element. In order to connect the start winding to the source of A.C. power for starting the motor and to disconnect the start winding when the motor approaches its operating speed, the gate signal is supplied by a power supply comprising a current transformer having its primary winding connected in series with the run winding and its secondary winding arranged to supply gating signals to the gating elements. This power supply is so designed that when the motor is drawing a high current during the initial starting thereof, the signal is strong enough to trigger or fire the rectifiers and thereby supply a starting current to the start winding. As the motor comes up to speed and the total current drawn by the motor decreases, the power supply is so designed that the signal applied to the gate elements by the triggering circuit is insufficient to fire or trigger the rectifiers thereby disconnecting the start winding from the power source. In a preferred embodiment of the present invention, the power supply includes an adjustable resistor shunt shunting the transformer secondary winding whereby the motor current, or in other words, the speed of the rotor, at which the start winding is removed from the circuit can be adjusted.

For a better understanding of the invention reference may be had to the following detailed description when considered in connection with the accompanying drawings wherein like parts in each of the figures are identified by the same reference characters and wherein.

The silicon controlled rectifiers employed in the practice of the present invention are a solid state transistor-like device each having anode and cathode electrode and a gating electrode or element. These rectifiers block the flow of alternating current in both directions until a small but significant signal is applied to the gating element whereupon current is conducted in one direction. In other words the gating element controls the conduction through the rectifier in that it initiates conduction. In direct current application, the gating element thereafter loses control over electric conduction through the anode and cathode of the rectifier and conduction will continue as long as power is supplied to the rectifier through the anode and cathode electrodes. However, in alternating current applications, the current through the silicon controlled rectifier is turned off or commutated by the reversal of the line voltage during each half cycle and since the turn-off time for silicon controlled rectifiers is in the order of 25 microseconds or less, the silicon controlled rectifiers will turn off every half cycle for ordinary power supply frequencies and remain non-conducting unless a gating signal is continuously or repetitively supplied to the gating element. For a more detailed description of silicon controlled rectifiers, reference is made to the publication "Controlled Rectifier Manual," first edition, published by the General Electric Company, Semiconductor Products Department, Auburn, New York (copyright 1960).

Figure 1:
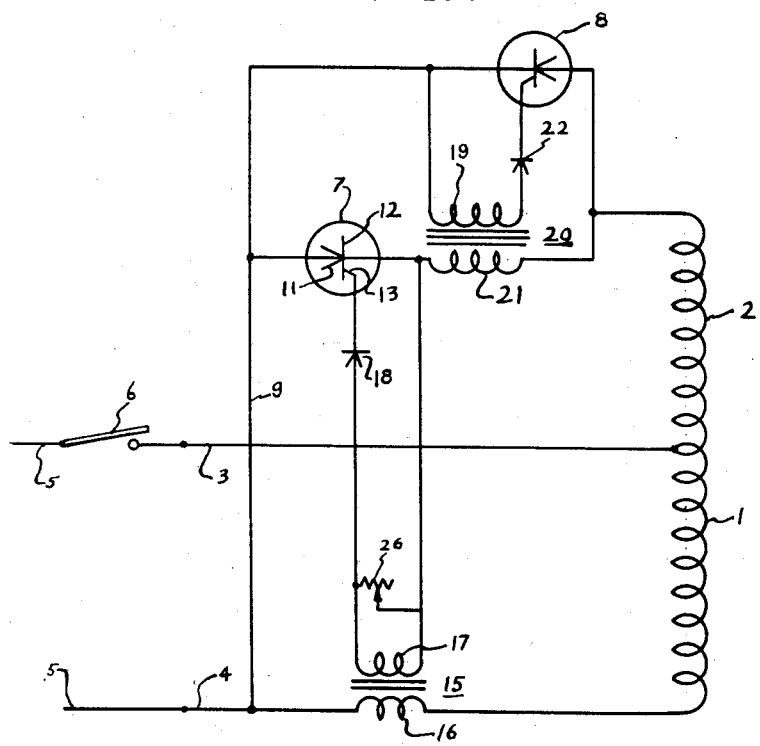
FIGURE 1 is a circuit diagram of one motor circuit embodying the present invention.

Referring to FIGURE 1 of the drawing, there is shown a preferred embodiment of the present invention in the form of a single phase electric motor comprising a run winding 1 and a start winding 2. These windings are arranged to be connected in parallel through leads 3 and 4 to a source of alternating current power supply 5. Switch 6 in one of the lead lines 3 or 4 is provided for turning the motor on and off.

In accordance with the usual practice the start winding 2 is so constructed or arranged within the motor that it is displaced in phase or spacing from the run winding 1 in order to provide the starting torque required to start a single phase motor. Once a motor of this type has approached or reached its normal operating speed, the start winding 2 is preferably removed from the motor circuit and this is accomplished in accordance with the present invention by means of a pair of parallel and oppositely connected silicon controlled rectifiers 7 and 8 in the starting circuit. More specifically the starting circuit can be traced in FIG. 1 as comprising the lead 4, a lead 9, the two silicon controlled rectifiers 7 and 8 connected in parallel and reversed relationship, the start winding 2 and the lead 3. Each of the silicon controlled rectifiers 7 and 8 have an anode 11, a cathode 12 and a gating element or electrode 13 and are connected into the starting circuit in reversed position relative to one another, so that when suitably fired or triggered by the application gating signals to the gating electrodes 13, one of the rectifiers will conduct half waves in one direction and the other the half waves in the other direction thereby supplying an alternating current to the start winding 2 whenever the rectifiers are rendered conducting in their inherent directions.

For the purpose of applying the required gating signal to the rectifiers 7 and 8 to energize the start winding 2 during initial energization, that is during starting, of the motor and to decrease the amplitude of that signal to a value less than that required to fire or trigger the rectifiers when the motor has come up to or has approached its operating speed, the circuit of FIGURE 1 includes a power supply comprising a current transformer 15 having its primary winding 16 connected in series with the run winding 1. Its secondary winding 17 is connected in series with the gating element 13 and cathode 12 of the rectifier 7 to form a triggering signal circuit which also includes a diode rectifier 18. The rectifier 18 prevents the gate voltage from becoming substantially negative with respect to the cathode 12 or in other words rectifies the current supplied through the gating element 13 of the rectifier 7 from the secondary winding 17 to eliminate the application to the gating element of a negative signal.

In the modification of the invention illustrated in FIGURE 1, the gating element for the rectifier 8 is supplied with a gating signal from the secondary winding 19 of the transformer 20, the primary winding 21 of this transformer being series connected with the rectifier 7. By this arrangement, when there is sufficient current flowing in the running circuit including the primary winding 16 of the transformer 15, gating signals are supplied to both the rectifiers 7 and 8 so that rectifier 7 conducts current in one direction or half cycle to the start winding and rectifier 8 in the opposite direction or half cycle. A diode rectifier 22 in the signal circuit for the rectifier 8 performs the same function as the diode rectifier 18.

With the two silicon controlled rectifiers 7 and 8 connected in parallel as described, they form an A.C. switch to control power to the start winding 2. Upon the closing of the switch 6, the rectifier 7 is fired by pulses from the transformer secondary winding 17 so that it is caused to conduct in a forward direction. Conduction through the rectifier 7 supplies power to the transformer 20 so that by means of the slaving gate circuit for the rectifier 8, the secondary winding 19 of the transformer 20 supplies a gating signal for the rectifier 8. Since the transformer 19 is employed as a current transformer, the maximum secondary voltage occurs when the primary current goes to zero and this pulse is then used to fire the rectifier 8 thus allowing forward conduction through the alternating current switch.

Under locked rotor conditions, that is when the motor rotor is at rest, a relatively high current flows through the running circuit including the run winding 1. This current, by means of the triggering circuit including transformer 15, provides a pulse of a magnitude greater than the minimum required to fire the rectifier 7 and in turn the rectifier 8. However, as the motor rotor comes up to speed, the run winding current decreases. However, as it normally will not decrease to a value which is insufficient to supply the required gating signals to the respective rectifiers, there is provided an adjustable resistor 26 for shunting the secondary winding 17 of the transformer 15. By suitable adjustment of this resistor 26, the secondary voltage can be reduced to a value such that it will be below the minimum required to fire the rectifiers when the motor approaches its normal operating speed.

Figure 3:
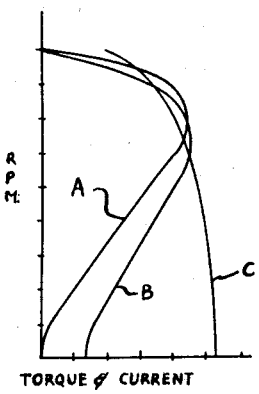
FIGURE 3 discloses curves illlustrating the operation of the present invention.

While the invention is applicable to motors designed to operate at any speed, the changing relationship between motor speed in revolutions per minute, the motor torque and also the current drawn for example by a 3600 r.p.m. motor at various speeds are illustrated by the curves of FIGURE 3. With reference to that figure, curve A represents the torque supplied by the run winding as the motor speed increases from zero r.p.m. to 3600 r.p.m. while curve B represents the torque supplied by both the start winding and run winding during the same period. It will be noted as the motor approaches a speed of about 3000 r.p.m. the run winding supplies most of the torque so that the presence of the start winding is no longer necessary. Curve C represents the total current drawn by the motor at various speeds. Initially at zero r.p.m. or, in other words, under locked rotor or stationary rotor conditions, the current drawn by the motor is relatively high but as the speed increases the current gradually decreases to a minimum depending upon the load imposed on the motor.

Taking into consideration the amplitude of current drawn by the motor under its normal operating conditions or in other words as it approaches its maximum speed, the resistance 26 is designed to shunt the secondary 17 of the transformer 15 sufficiently to reduce the secondary voltage to a value substantially less than that required to fire the rectifier 7 when the speed of a 3600 r.p.m. motor for example has reached 3000 or more r.p.m. or in other words at approximately the point where the difference between the running winding torque A and the running and start winding torque B are approaching a minimum. However, with an adjustable resistance 26, the point at which the start winding is removed from the circuit can be varied depending upon the conditions under which the motor is operating or in other words whether or not the start winding torque is required at intermediate speeds.

Figure 2:
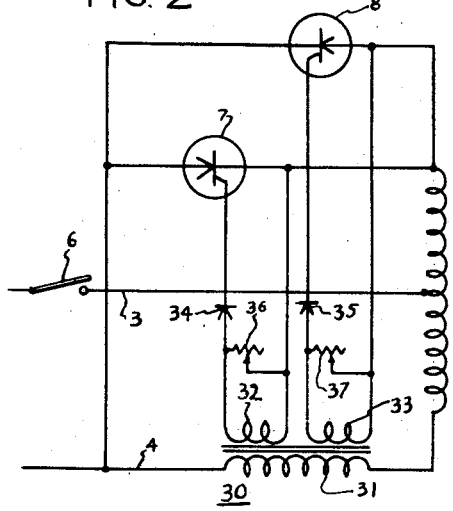
FIGURE 2 is a circuit diagram of a second embodiment of the present invention.

The modification of the invention shown in FIGURE 2 differs from that shown in FIGURE 1 primarily in that the silicon controlled rectifiers 7 and 8 are both fired from a transformer 30 having its primary winding 31 connected in the running circuit in the same manner as that of the transformer 15 but differing from that transformer by having a first secondary winding 32 for supplying the gating signal to the rectifier 7 and a second secondary winding 33 for supplying the gating voltage to the rectifier 8. In this embodiment of the invention, the diode rectifiers 34 and 35 and the adjustable resistances 36 and 37 perform the same functions as the diodes 18 and 22 and the adjustable resistance 26 in the circuitry of FIGURE 1. It will be noted that two adjustable resistances 36 and 37 are required and each must be adjusted so that the gating signal supplied to the rectifier 7 or 8 served by the circuit including that resistance will drop below that required to fire the rectifier when the motor comes up to speed.

From the foregoing description it will be appreciated that the invention provides a new and improved motor starting circuit which is completely electrical in its operation in that it eliminates the usual mechanically operated switches and switch contacts heretofore employed for energization or de-energization of a motor starting circuit.

While the invention has been described with reference to particular embodiments thereof, it will be understood that various modifications may be made by those skilled in the art without actually departing from the invention and it is therefore intended by the appended claims to cover all such variations as come within the true spirit and scope of the invention.

What I claim as new and desire to secure by Letters Patent of the United States is:

1. In combination with a single phase motor having a run winding and a start winding, a transformer including a primary winding and a secondary winding, a running circuit including the primary winding of said transformer and said run winding in series connection, a pair of controlled rectifiers each having a control gate element, a starting circuit including said start winding and said rectifiers connected in parallel and reversed relationship and in series with said start winding, power supply means for supplying a gating control signal to the gate elements of said rectifiers from the secondary winding of said transformer whereby the firing of said rectifiers is determined by the magnitude of the current flowing through said running circuit, said power supply means being adapted to supply a gating control signal which is sufficient to fire said rectifiers when the current flowing through said running circuit is high during and immediately following initial energization of said running circuit but which is insufficient to fire said rectifiers when the run winding current decreases as the motor comes up to speed.

2. In combination with a single phase motor having a run winding and a start winding, a current transformer including a primary winding and a secondary winding, a running circuit including the primary winding of said transformer and said run winding in series connection, a pair of controlled rectifiers each having a control gate element, a starting circuit including said start winding and said rectifiers connected in parallel and reversed relationship and in series with said start winding, power supply means for supplying a gating control signal to the gate elements of said rectifiers from the secondary winding of said transformer whereby the firing of said rectifiers is determined by the magnitude of the current flowing through said running circuit, said power supply means including adjustable resistance means shunting said secondary winding to permit adjustment of the gating control signal so that it is sufficient to fire said rectifiers when the current flowing through said running circuit is high during and immediately following initial energization of said running circuit but insufficient to fire said rectifiers when the run winding circuit decreases as the motor comes up to speed.

3. In combination with a single phase motor having a run winding and a start winding, a current transformer including a primary winding and a secondary winding, a running circuit including the primary winding of said transformer and said run winding in series connection, a pair of controlled rectifiers each having a control gate element, a starting circuit including said start winding and said rectifiers connected in parallel and reversed relationship with one another and in series with said start winding, and a triggering circuit for supplying a gating control signal for firing said rectifiers, said triggering circuit comprising means connecting said gate elements to the secondary winding of said transformer whereby the high current flowing in said running circuit upon initial energization of said motor effects energization of said starting circuit through said pair of rectifiers, and a resistance connected in parallel with said secondary winding for shunting said secondary winding and decreasing the gating control signal below that required for firing said rectifiers when the current in said running circuit decreases as the motor comes up to speed.

4. In combination with a single phase motor having a run winding and a start winding, a current transformer including a primary winding and a secondary winding, a running circuit including the primary winding of said transformer and said run winding in series connection, a pair of controlled rectifiers each having a control gate element, a starting circuit including said start winding and said rectifiers connected in parallel and reversed relationship with one another and in series with said start winding, and a triggering circuit for supplying a gating control signal for firing said rectifiers, said triggering circuit comprising in series connection the secondary winding of said transformer and a rectifier whereby the high current flowing in said running circuit upon initial energization of said motor effects energization of said starting circuit through said pair of rectifiers, and an adjustable resistance shunt connected in parallel with said secondary winding for decreasing the gating control signal below that required for firing said rectifiers when the current in said running circuit decreases as the motor comes up to speed.

5. In combination with a single phase motor having a run winding and a start winding, a current transformer including a primary winding and two secondary windings, a running circuit including the primary winding of said transformer and said run winding in series connection, a pair of controlled rectifiers each having a control gate element, a starting circuit including said start winding and said rectifiers connected in parallel and reversed relationship and in series with said start winding, and a pair of triggering circuits for supplying gating control signals for firing said rectifiers, each of said triggering circuits comprising one of said secondary windings of said transformer rectifier and the gating element of one of said rectifiers whereby the high current flowing in said running circuit upon initial energization thereof effects energization of said starting circuit through said pair of rectifiers, each of said triggering circuits also including a resistance shunt connected in parallel with the secondary winding decreasing the strength of the gating control signals below that required for firing said rectifiers when the current in said running circuit decreases as the motor comes up to speed.

6. In combination with a single phase motor having a run winding and a start winding, a current transformer including a primary winding and a secondary winding, a running circuit including the primary winding of said transformer and said run winding in series connection, a pair of controlled rectifiers each having a control gate element, a starting circuit including said start winding and said rectifiers connected in parallel and reversed relationship with one another and in series with said start winding, power supply means for supplying a gating control signal to the gate element of one of said rectifiers from the secondary winding of said transformer whereby the firing of said one of said rectifiers is determined by the magnitude of the current flowing through said running circuit, said power supply means being adapted to supply a gating control signal which is sufficient to fire said one of said rectifiers when the current flowing through said running circuit is high during and immediately following initial energization of said running circuit but which is insufficient to fire said rectifiers when the run winding current decreases as the motor comes up to speed, and means for simultaneously firing the other of said rectifiers comprising a second transformer having a primary winding in series connection with said first rectifier and in parallel connection with said second rectifier and a secondary winding is connected to the gating element of said other of said rectifiers.

No references cited.